United States Patent [19]
Johnson

[11] Patent Number: 5,452,126
[45] Date of Patent: Sep. 19, 1995

[54] LIGHTWEIGHT BINOCULAR TELESCOPE

[75] Inventor: John L. Johnson, Huntsville, Ala.

[73] Assignee: The United States of America as represented by the Secretary of the Army, Washington, D.C.

[21] Appl. No.: 152,633

[22] Filed: Nov. 10, 1993

[51] Int. Cl.$^6$ .............................................. G02B 23/00
[52] U.S. Cl. ..................................... 359/407; 359/726
[58] Field of Search ........................... 359/726–732, 359/642, 850, 399, 407, 364–366; 351/158

[56] References Cited

U.S. PATENT DOCUMENTS 3,752,560  8/1973  Lunn .................................... 359/387

FOREIGN PATENT DOCUMENTS 266005   5/1988   European Pat. Off. ............ 359/850
1691809  11/1991  U.S.S.R. .............................. 359/850

*Primary Examiner*—Paul M. Dzierzynski
*Assistant Examiner*—James Phan
*Attorney, Agent, or Firm*—Anthony T. Lane; Hugh P. Nicholson; Hay Kyung Chang

[57] ABSTRACT

A lightweight telescopic lens of monolithic construction is revealed that incorporates additional refractive and reflective curved surfaces to produce all the optical functions performed by an ordinary telescope. A pair of such lenses may be mounted in an eyeglass frame to yield a telescope that can be worn like a pair of eyeglasses, thus affording superior image stability as well as free the user's hands. Minor modifications involving the use of several menisci of a different index of refraction from that of the core lens can be made to achieve achromatism of emergent light from achromatic input light. The entire core lens can also be shaped into a meniscus to take advantage of the principle of total internal reflection, thereby increasing the light-gathering aperture while at the same time rendering the lens even more compact and lightweight.

6 Claims, 5 Drawing Sheets

LIGHTWEIGHT BINOCULAR TELESCOPE

The invention described herein may be manufactured, used, and licensed by or for the Government for governmental purposes without the payment to me of any royalties thereon.

BACKGROUND OF THE INVENTION

Binoculars described by previous art are usually heavy and bulky. They also suffer from image instability and frequently require the use of active gyroscopically-stabilized systems to compensate for the jitter caused by the relative motions of the user's hands and eyes or demand the use of support structures such as tripods.

SUMMARY OF INVENTION

The lightweight binocular telescope is of one-piece construction, compact enough to be installed in place of ordinary eyeglass lenses, yielding a head-mounted binocular telescope that is worn like a pair of glasses. This affords superior image stability in comparison with the ordinary hand-held binocular, in addition to freeing the user's hands. The lightweight binocular telescope utilizes a lens made of suitable optical material such as low-dispersion glass or plastic and incorporates therein additional refractive and reflective curved surfaces to produce all the optical results achieved by a traditional telescope.

DESCRIPTION OF THE PREFERRED EMBODIMENT

Figure 1:
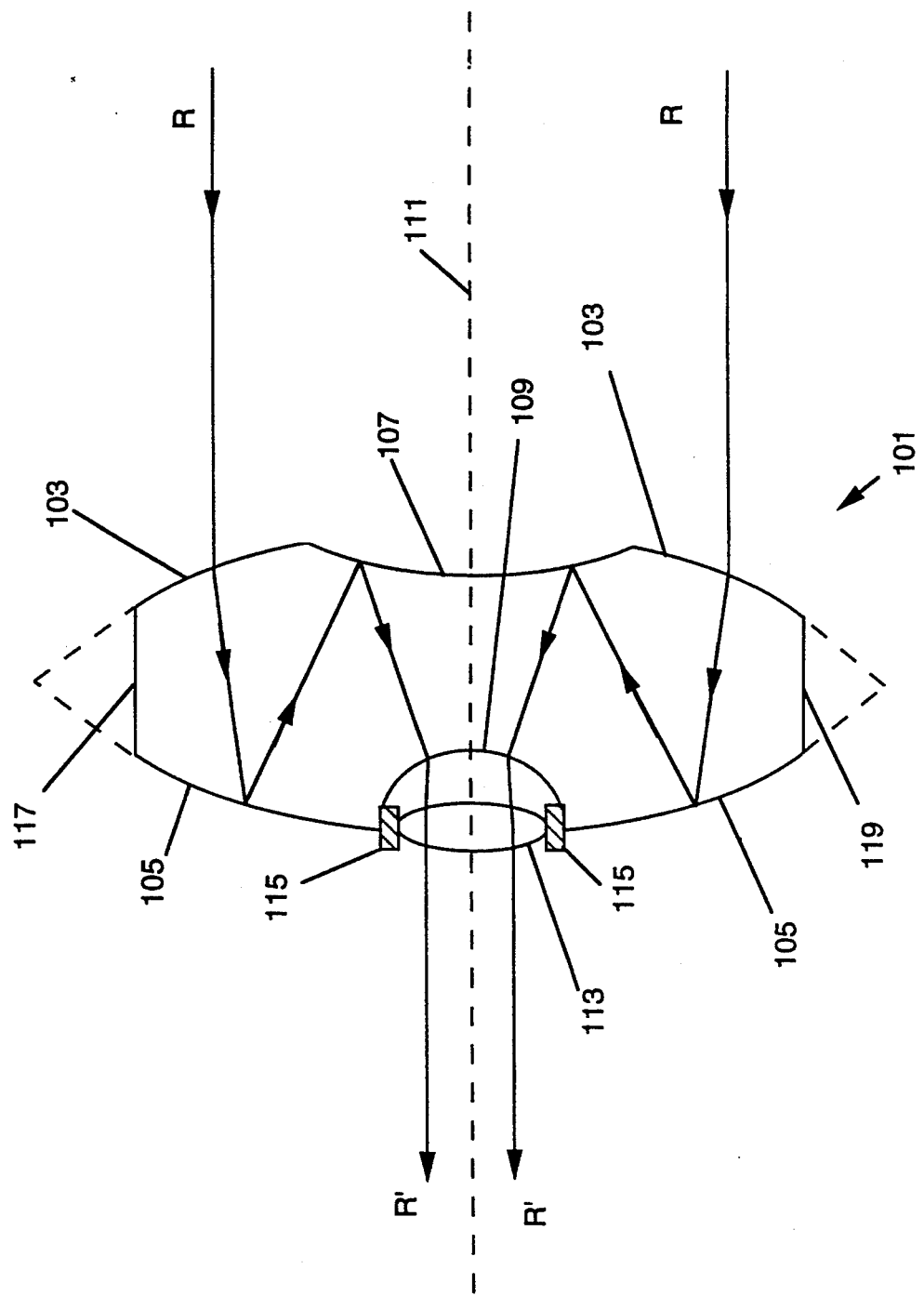
FIG. 1 shows a basic lightweight telescopic lens incorporating the various surfaces in accordance with the instant invention.
Figure 2:
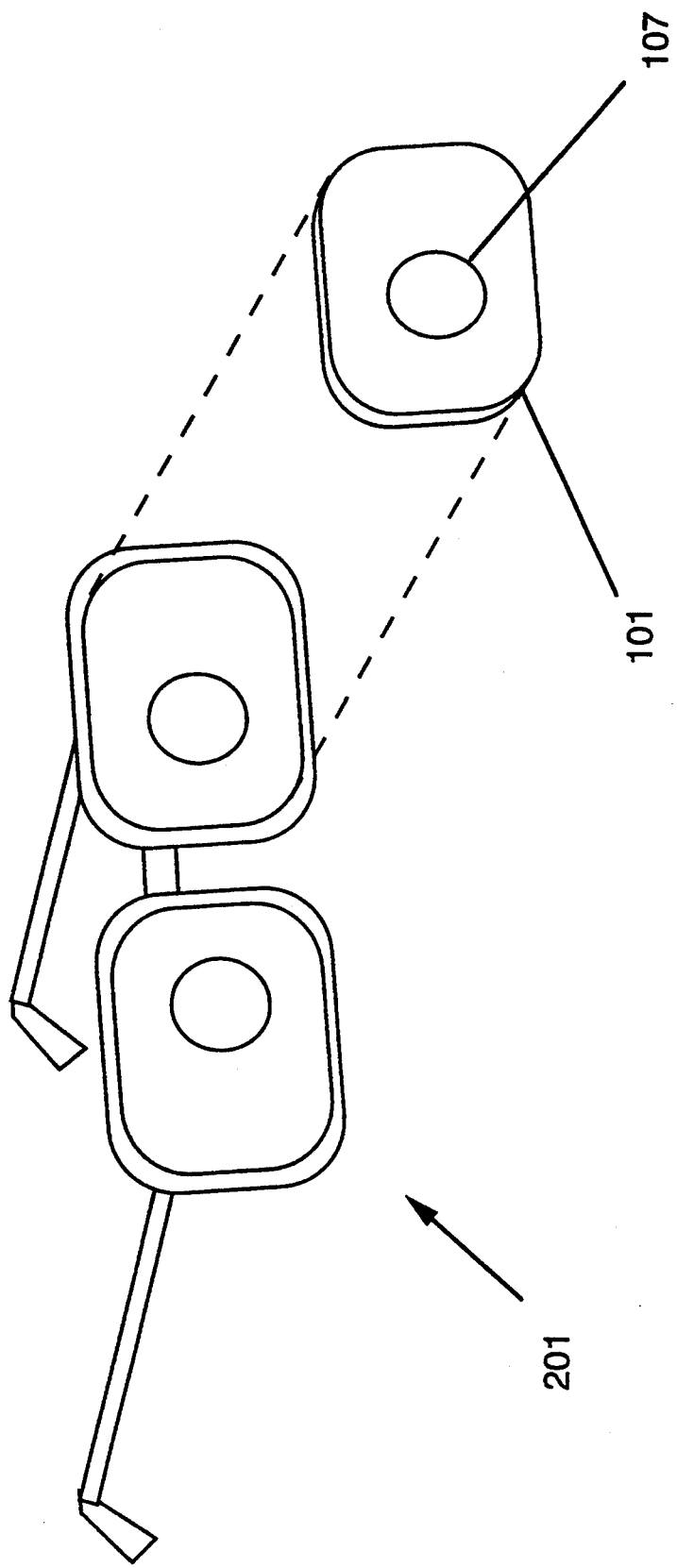
FIG. 2 depicts how a pair of such lenses can be mounted in an eyeglass frame to yield a binocular telescope to be worn like a pair of eyeglasses.

Referring to the drawings wherein like numbers refer to like parts and arrows represent optical paths, FIG. 1 is used to describe the operation of lightweight telescopic lens 101. Incoming ray R is incident on transmissive convex side 103 and is refracted thereby prior to its continued travel through the lens material to impinge on reflective convex side 105. R is reflected by reflective convex side 105 and sent forward to be incident on reflective concave depression 107. The reflective concave depression which is centrally located on transmissive convex side 103 further reflects R toward transmissive concave depression 109 where R is refracted for the second time and emanates from lens 101 as R'. Transmissive concave depression 109 is centrally located on reflective convex side 105 and, like reflective concave depression 107, is coaxial with optical axis 111 of lens 101. However, the two concave depressions do have different curvatures, in general. In the above-described embodiment of the telescopic lens, transmissive convex side 103 acts as a convex lens, reflective convex side 105 and reflective concave depression 107 are equivalent to the primary and secondary mirrors, respectively, of a reflective telescope and transmissive concave depression 109 acts as a concave lens. Reflective side 105 and depression 107 can be fabricated by using any suitable method known in the art. The top and bottom sides 117 and 119, respectively, of lens 101 may also be made reflective to minimize light loss by outward transmission. However, sides 103 and 105 would join each other at their outer perimeters if extended as indicated by the dotted lines near the top and bottom sides. The above-described features of monolithic telescopic lens 101, in cooperation with each other, achieve the same results as does a traditional hand-held binocular or telescope but make lens 101 compact and lightweight rendering it quite suitable to be mounted onto typical eyeglass frame 201 such as shown in FIG. 2 and thus be easily worn by the user.

Lens 101 illustrated in FIG. 1 can be complemented by focusing eyepiece 113 positioned slidably as shown within transmissive concave depression 109. Slidability along optical axis 111 to achieve maximum focus of the image is provided by support member 115 on which eyepiece 113 is suitably mounted for this purpose.

The operability of lens 101 requires long pathlengths through the optical material of the lens and very fast surfaces, that is, large diameters and short focal lengths. These requirements are met by proper material selection and aspheric optical design optimization. Many plastics with high transmission have dispersion equal to or lower than that of fused silica and thus are suitable candidate materials, along with low-dispersion glass, for lens 101. The image produced by lens 101 is upright virtual. The use of aspherics in very fast optical systems (f/1.0 and faster) has been successful in providing high quality imaging systems with reasonable fields of view.

Figure 3:
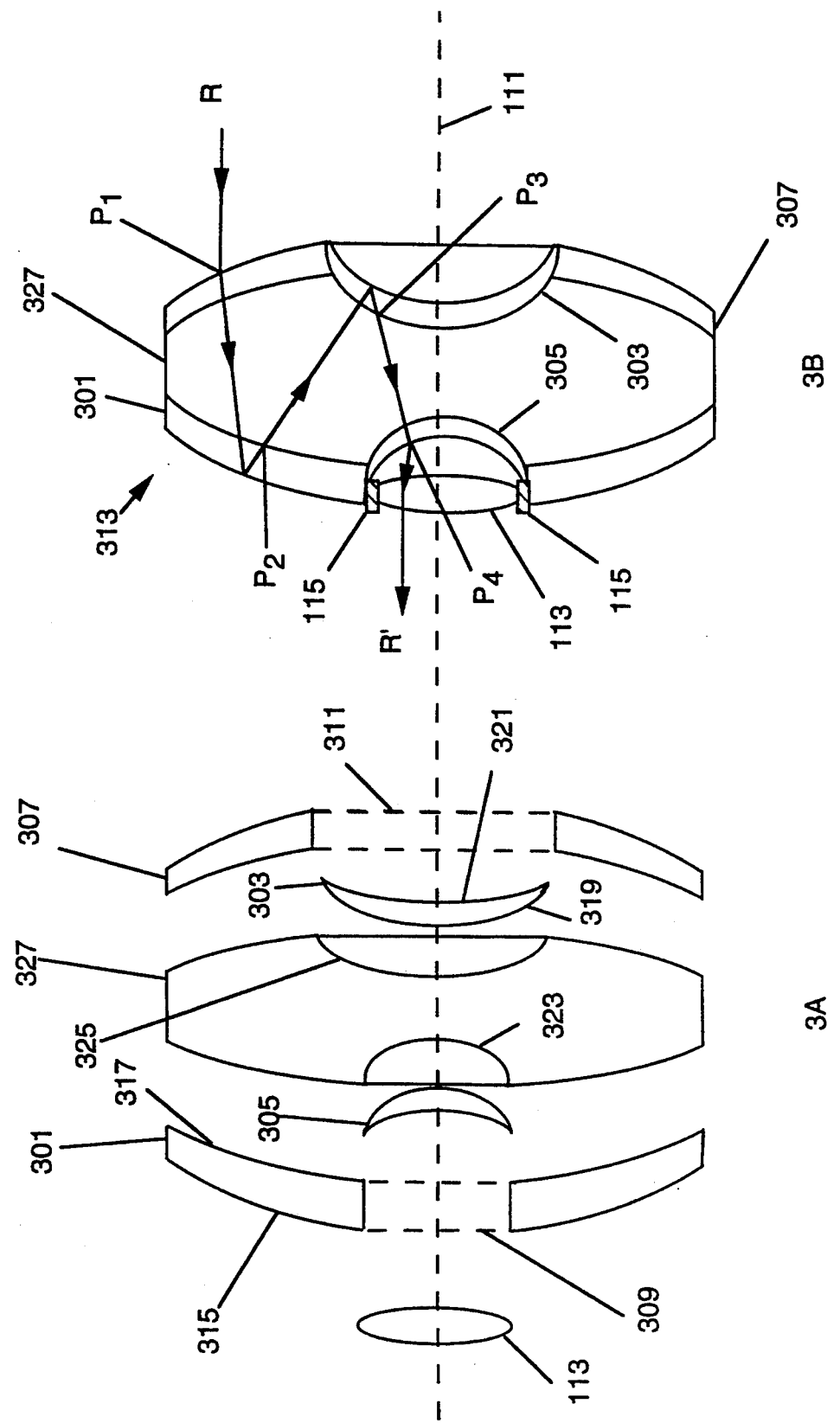
FIG. 3 illustrates the use of a modified telescopic lens to achieve color correction.

FIG. 3 illustrates that with a few modifications, lens 101 can provide achromatic color correction. The modifications include four menisci added to the transparent core lens 327 which is like lens 101 shown in FIG. 1, the menisci having a different index of refraction than that of core lens 327. For example, core lens 327 could be of crown glass whereas the menisci could be of flint glass. FIG. 3A gives an exploded view of the achromatic telescopic lens 313 showing all of its component parts. In this achromatic version of the telescopic lens, reflective convex side 105, initially shown in FIG. 1, takes the form of first meniscus 301 that has a reflective outer surface 315 and a transmissive inner surface 317. Meniscus 301 further has hole 309 through the center thereof and is coupled to one convex side of lens 327 as depicted in FIG. 3B. The other convex side of the lens has coupled thereto fourth meniscus 307 having hole 311 through the center thereof and an inner and an outer surfaces both of which are transmissive to transmit incident light therethrough. Holes 309 and 311 are coaxially aligned with first depression 323 and second depression 325, respectively. Second meniscus 303, having reflective inner surface 321 and transmissive outer surface 319 is fitted into the second depression and third meniscus 305 whose inner and outer surfaces both are transmissive is fitted into first depression 323. Achromatic lens 313, when all of its components are integrated, presents a monolithic appearance as illustrated in FIG. 3B. Achromatic color correction of incoming ray R is accomplished because refraction of R occurs at every point where R leaves a meniscus and enters core lens 327 or vice versa, following the general optical paths described with respect to the telescopic lens of FIG. 1. More specifically, first meniscus 301 and fourth meniscus 307 provide color correction of R between points P1 and P2. By the time R reaches point P2, its different wavelengths have all been corrected and from that point on, R travels to point P3. Menisci 303 and 305, then, provide color correction for the optical path between points P3 and P4 such that the R' emerging from the achromatic lens 31 3 is color-corrected i.e. white emergent light from white incoming light. As in the telescopic lens described in FIG. 1, achromatic lens 313 may also be complemented with focusing eyepiece 113 placed slidably along optical axis 111 within first depression 323. The various menisci can be assembled with core lens 327 using any suitable optical cement.

Figure 4:
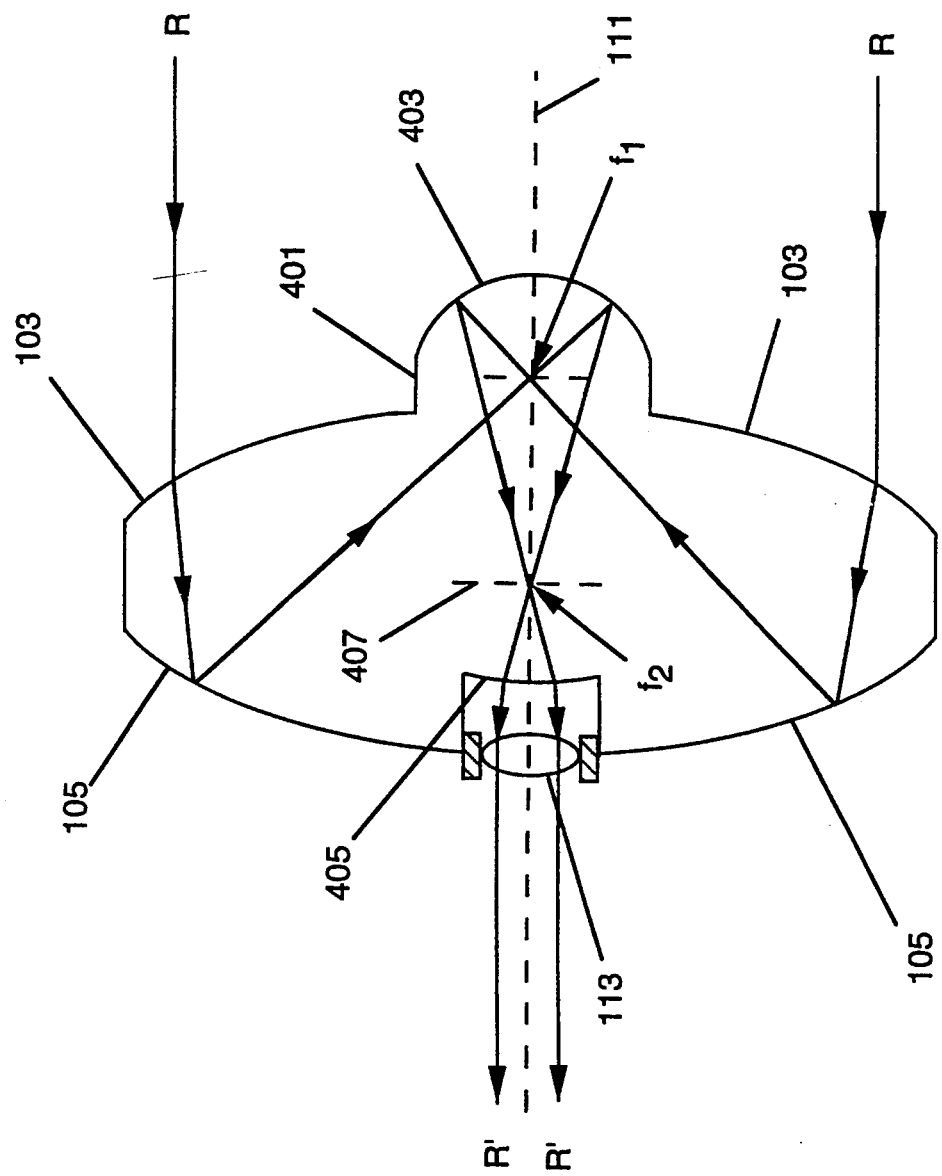
FIG. 4 illustrates another modification of the basic lens to incorporate two foci as well as crosshairs to assist in visual location of an object.

Another variation of telescopic lens 101 is depicted in FIG. 4. Here, instead of a depression on the transmissive convex side, a protrusion 401 with reflective surface 403 is found. R, incident on reflective convex side 105, focuses at first focus f1 which is then re-imaged at second focus f2 by reflective surface 403. The two foci are located along axis 111 and are required so that R' emerging from depression 405, now made convex, is an upright virtual image. Crosshair 407 is shown as embedded at f2 but can be either at f2 or f1 for better aiming at any viewed object. Re-imaging capability permits the insertion of crosshairs. Slidable focusing eyepiece 113 may be placed as shown in the figure. Reflective surface 403 and transmissive depression 405 are coaxial with optical axis 111 as is eyepiece 113.

Figure 5:
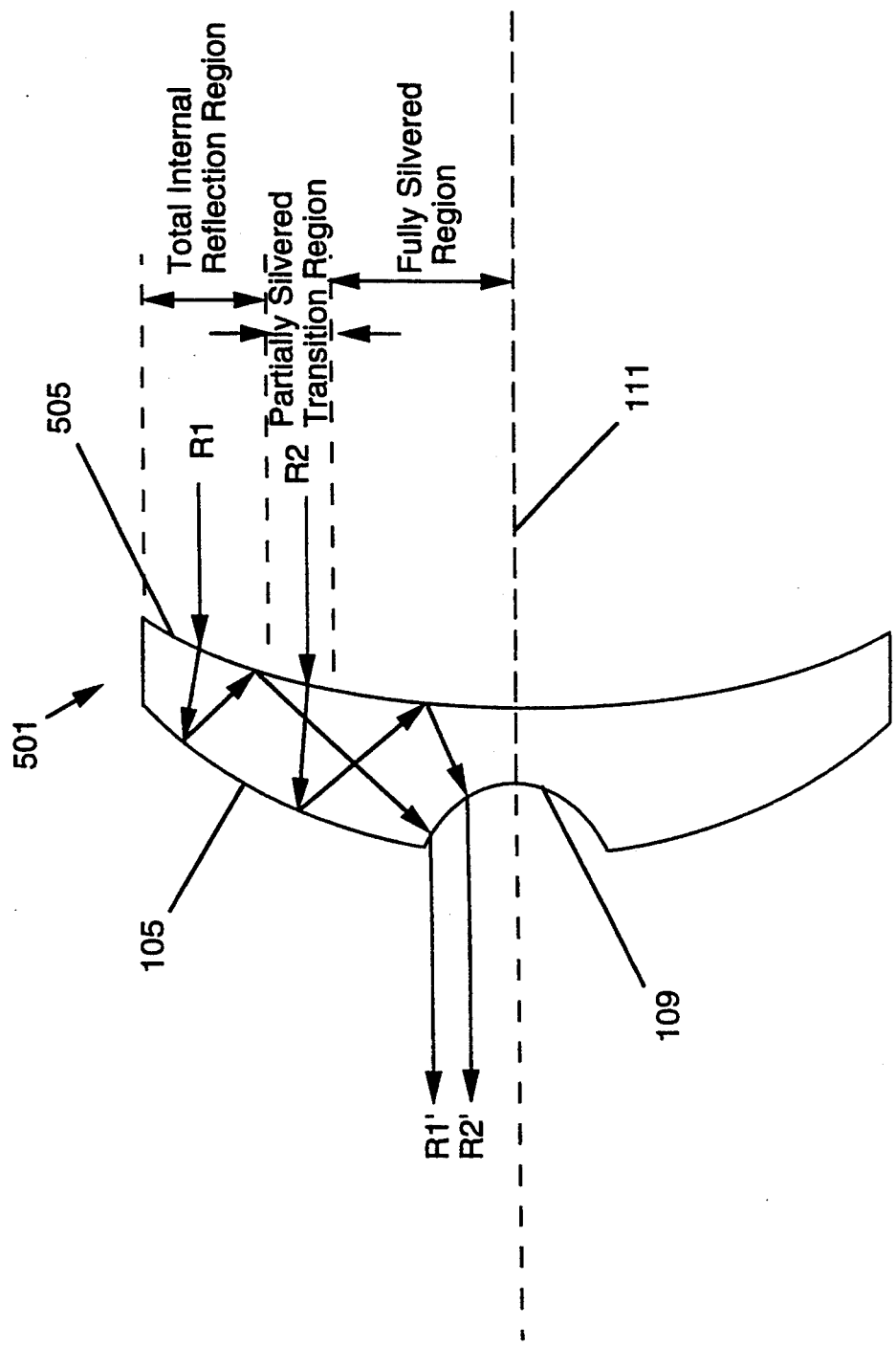
FIG. 5 shows how the telescopic lens can be shaped into a meniscus to take advantage of total internal reflection.

Still another variation of telescopic lens 101 is illustrated in FIG. 5 where the lens is now shown as meniscus 501 having outer convex side 105 that is reflective except for transmissive concave depression 109 and transmissive inner convex side 505 that is partially silvered for reflection, the degree of silvering gradually increasing toward optical axis 111. Ray R1, incoming near the perimeter of the meniscus, is transmitted through inner convex side 505 and travels to impinge on outer convex side 105. The shape of meniscus 501 is chosen so that when outer convex side 105 reflects R1, R1 is incident on inner convex side 505 at the critical angle, resulting in total internal reflection of R1. Thence, R1 proceeds toward depression 109 for ultimate emanation therethrough. However, for ray R2 incoming closer to optical axis 111 of meniscus 501, total internal reflection from inner convex side 505 is not achieved after its initial reflection from outer convex side 105 due to low angle of incidence on the inner side. Therefore, in these regions of incomplete internal reflection, the loss is compensated by silvering the inner convex side, the degree of silvering gradually increasing toward the axis. In the fully silvered region, immediately around the optical axis, the recommended thickness of the silvering is about 100 microns. Meniscus 501, due to the greater curvature permitted by its shape as well as the utilization of total internal reflection and the graduated silvering, is even more compact and lightweight than the other versions of telescopic lens 101 and allows a greater effective lightgathering aperture.

Although particular embodiments and forms of this invention have been illustrated, it is apparent that various other modifications and embodiments of the invention may be made by those skilled in the art without departing from the scope and spirit of the foregoing disclosure. Accordingly, the scope of the invention should be limited only by the claims appended hereto.

I claim:

1. A lightweight binocular telescope, said telescope comprising: a lens having an optical axis and a refractive index, said lens being defined by a first convex side and a second convex side, said sides tending to join each other at their outer perimeters; said first side comprising a first depression at the center thereof and a first non-depressed region surrounding said first depression and said second side comprising a second depression at the center thereof and a second non-depressed region, said second non-depressed region surrounding said second depression and being suitable for transmitting through said second non-depressed region light to be incident on said first non-depressed region; a first reflective means coupled to said first non-depressed region for reflecting incident light toward said second depression and a second reflective means coupled to said second depression for further reflecting light impinging thereon toward said first depression for ultimate emanation therethrough.

2. A telescope as set forth in claim 1, wherein said depressions are coaxial with said optical axis.

3. A telescope as set forth in claim 2, wherein said first and second depressions have a first and a second curvatures, respectively.

4. A lightweight binocular telescope, said telescope comprising: a lens having an optical axis, said lens being defined by a reflective convex side for reflecting light incident thereon and a transmissive convex side for transmitting incoming light therethrough toward said reflective side, said convex sides tending to join each other at their outer perimeters, said reflective side having thereon a transmissive concave depression and said transmissive side having thereon a reflective concave depression, said depressions being coaxial with said axis such that the light reflected from said reflective convex side impinges on said reflective depression and is further reflected thereby toward said transmissive depression for ultimate emanation therethrough.

5. A telescope as set forth in claim 4 wherein said transmissive depression has a first curvature and said reflective depression has a second curvature, said curvatures being dissimilar.

6. A telescope as set forth in claim 5, wherein said telescope further comprises a focusing eyepiece, said eyepiece being mounted in said transmissive concave depressionr respectively, slidably along said optical axis.

* * * * *